(12) United States Patent
Guingold

(10) Patent No.: US 10,907,475 B2
(45) Date of Patent: Feb. 2, 2021

(54) J-ENGINE

(71) Applicant: Alexander Guingold, Thornhill (CA)

(72) Inventor: Alexander Guingold, Thornhill (CA)

( * ) Notice: Subject to any disclaimer, the term of this patent is extended or adjusted under 35 U.S.C. 154(b) by 0 days.

(21) Appl. No.: 16/384,229

(22) Filed: Apr. 15, 2019

(65) Prior Publication Data

US 2019/0242256 A1 Aug. 8, 2019

Related U.S. Application Data

(62) Division of application No. 15/095,532, filed on Apr. 11, 2016, now Pat. No. 10,294,790.

(60) Provisional application No. 62/187,729, filed on Jul. 1, 2015.

(51) Int. Cl.
| | | |
|---|---|---|
| F01B 9/00 | (2006.01) | |
| F01B 9/04 | (2006.01) | |
| F16H 19/04 | (2006.01) | |
| F16D 41/18 | (2006.01) | |
| F16D 41/00 | (2006.01) | |
| F01B 1/08 | (2006.01) | |
| F02B 75/24 | (2006.01) | |
| F02B 75/32 | (2006.01) | |

(52) U.S. Cl.
CPC ............. *F01B 9/047* (2013.01); *F16D 41/00* (2013.01); *F16D 41/18* (2013.01); *F16H 19/043* (2013.01); *F01B 1/08* (2013.01); *F02B 75/24* (2013.01); *F02B 75/32* (2013.01)

(58) Field of Classification Search
CPC .. F01B 9/047; F01B 1/08; F16D 41/00; F16H 19/043; F02B 75/32; F02B 75/24
USPC ............................................ 74/35; 123/197.3
See application file for complete search history.

(56) References Cited

U.S. PATENT DOCUMENTS

| | | | | |
|---|---|---|---|---|
| 3,756,090 A | * | 9/1973 | Mella | B25B 13/466 |
| | | | | 74/130 |
| 4,090,413 A | | 5/1978 | Vickland | |
| 4,192,326 A | | 3/1980 | Klinge | |
| 4,433,649 A | | 2/1984 | Shin | |
| 5,136,888 A | | 8/1992 | Nix | |
| 5,673,665 A | * | 10/1997 | Kim | F01B 9/047 |
| | | | | 123/197.1 |
| 5,675,863 A | | 10/1997 | Holden et al. | |
| 5,934,243 A | | 8/1999 | Kopystanski | |
| 6,247,308 B1 | | 6/2001 | Solell et al. | |
| 6,904,888 B1 | * | 6/2005 | Heifets | F02B 75/24 |
| | | | | 123/197.1 |
| 7,765,803 B2 | | 8/2010 | Lee et al. | |
| 8,833,339 B2 | * | 9/2014 | Konig | F01B 3/0005 |
| | | | | 123/311 |
| 9,115,785 B1 | | 8/2015 | Kramer et al. | |

(Continued)

FOREIGN PATENT DOCUMENTS

| | | | |
|---|---|---|---|
| CA | 2925973 A1 | 1/2017 | |
| GB | 719392 A | * 12/1954 | ............. F01B 9/047 |

*Primary Examiner* — Victor L MacArthur

(74) *Attorney, Agent, or Firm* — Kramer Amado PC

(57) ABSTRACT

Various exemplary embodiments relate to an engine including a cylindrical cassette that converts linear into rotational motion. The linear motion is provided by a normal cylinder and valve mechanism driving pistons in a reciprocating motion, and the rotational motion is transmitted to an output shaft. Further embodiments relate to methods of converting linear motion to rotational motion by using a cylindrical cassette.

6 Claims, 17 Drawing Sheets

(56) References Cited

U.S. PATENT DOCUMENTS

| | | | |
|---|---|---|---|
| 2011/0232405 A1* | 9/2011 | Morin | F16H 55/26 |
| | | | 74/417 |
| 2012/0103048 A1 | 5/2012 | Vieten et al. | |
| 2013/0087120 A1* | 4/2013 | Konig | F01B 3/0005 |
| | | | 123/311 |
| 2015/0013635 A1 | 1/2015 | Brooks | |
| 2016/0363198 A1 | 12/2016 | Sanders | |

* cited by examiner

J-ENGINE

CROSS-REFERENCE TO RELATED APPLICATIONS

This application is a divisional of U.S. application Ser. No. 15/095,532, filed Apr. 11, 2016, the entire contents of which is incorporated herein by reference for all purposes as if fully set forth herein. This application is based upon and claims the benefit of priority from U.S. Provisional Application No. 62/187,729, filed Jul. 1, 2015, which is hereby incorporated by reference for all purposes as if fully set forth herein.

FIELD OF THE INVENTION

This invention involves a mechanical device that converts the linear motion of a piston into rotational motion of an output shaft without use of a crankshaft by using a rack and pinion.

BACKGROUND

In a traditional combustion engine, the linear motion of the pistons is converted into rotational motion using a crankshaft and connecting rod. This approach is inherently inefficient, since the connecting rod and the crank of the crankshaft and the connecting rod and piston in the cylinder run both connect at an angle. As a result, a percentage of power is lost, and designs using a crankshaft have a limited speed of the output shaft of the motor relative to the power of the piston.

Engines have been designed that instead use a rack and pinion system to convert linear motion into rotational motion. U.S. Pat. No. 4,433,649 of Shin shows an internal combustion engine that uses a rack and pinion system to use a long stroke engine with small area pistons. However, the design of Shin still uses a crankshaft, albeit with a reduced function compared to a traditional engine. In Shin, the power output function is removed from the crankshaft; however, a crankshaft is still used to provide a flywheel function and control timing.

U.S. Pat. No. 7,765,803 of Lee et al. also uses a rack and pinion system. As may be seen in FIG. 2 of U.S. Pat. No. 7,765,803, the design uses a multitude of small parts in its construction, which has drawbacks in terms of expense and complication of manufacture and assembly.

U.S. patent application Ser. No. 14/329,338 of Brooks (US Publication No. 2015/0013635) is a rack and pinion system that uses a complex, shaped rack with a steel toe and a milled groove into which is inserted a finger. Moving along the groove, the rack makes a complex movement which results in a loss of power. This design creates a large friction load which is not conductive to work at high engine speeds.

SUMMARY

The inventive device uses a rack and pinion system combined with a cassette to provide a new engine design. This design addresses some of the drawbacks of engines seen in the prior art, providing a useful reduction in friction, decrease in engine complexity, and corresponding reductions in size and weight. The inventive engine is designed to use less parts, and so should be easier to manufacture. As a result of the decrease in friction and number of parts, the inventive engine should be more robust (i.e. less likely to break or wear out) and easier to maintain. This invention has efficiency and space advantages over conventional engines and existing rack and pinion engine designs.

In accordance with the present invention, there is provided a cylindrical cassette with a cylindrical inner sleeve and an cylindrical outer sleeve, the inner sleeve fitting inside the outer sleeve and configured so that when the outer sleeve is rotated in a first direction, the inner sleeve is also rotated, and when the outer sleeve is rotated in a second direction opposite to the first direction, the inner sleeve is not rotated; said cassette having a bevel gear at each axial end; and said outer sleeve having teeth oriented along the axis of the cassette. In one aspect of the present invention, the inner sleeve has two combs and the outer sleeve has two sets of retractable fingers configured to interact with said combs. In another aspect of the present invention, the inner sleeve has four combs and the outer sleeve has four sets of retractable fingers configured to interact with said combs.

In accordance with the present invention, there is provided a first cylindrical cassette with a first cylindrical inner sleeve and a first cylindrical outer sleeve, the first inner sleeve fitting inside the first outer sleeve and configured so that when the first outer sleeve is rotated in a first direction, the first inner sleeve is also rotated, and when the first outer sleeve is rotated in a second direction opposite to the first direction, the first inner sleeve is not rotated; said first cassette having a first bevel gear and a second bevel gear at each axial end; and said first outer sleeve having teeth oriented along the axis of the first cassette; a second cylindrical cassette in axial alignment with the first cylindrical cassette; the second cylindrical cassette having a second cylindrical inner sleeve and a second cylindrical outer sleeve, the second inner sleeve fitting inside the second outer sleeve and configured so that when the second outer sleeve is rotated in the first direction, the second inner sleeve is also rotated, and when the second outer sleeve is rotated in the second direction opposite to the first direction, the second inner sleeve is not rotated; said second cassette having a third bevel gear and a fourth bevel gear at each axial end; and said second outer sleeve having teeth oriented along the axis of the cassette; an output load shaft that is turned by the first inner sleeve and the second inner sleeve; and a set of cylinders and pistons connected to racks and driving the racks in an alternating linear motion; where the racks interact with the teeth on the first outer sleeve and second outer sleeve to alternate between: rotating the first outer sleeve in the first direction and rotating the second outer sleeve in the second direction; and rotating the first outer sleeve in the second direction and rotating the second outer sleeve in the first direction.

In an aspect of this invention, the output load shaft has a spline and the first inner sleeve and the second inner sleeve has a keyway and the output load shaft is turned by the first inner sleeve and the second inner sleeve by the spline interacting with the keyway.

In another aspect of this invention, there is provided a fifth bevel gear configured to interact with the second bevel gear and the third bevel gear; a sixth bevel gear configured to interact with the first bevel gear; a seventh bevel gear configured to interact with the fourth bevel gear; a first tapered segment bevel gear configured to interact with the sixth bevel gear and configured with a keyway that interacts with the spline on the output load shaft; a second tapered segment bevel gear configured to interact with the seventh bevel gear and configured with a keyway that interacts with the spline on the output load shaft; a flywheel rotationally attached to the output load shaft; and an electric starter configured to rotate the flywheel. In accord with the present invention, there is provided a method of starting the engine by activating the electric motor and turning the flywheel.

In another aspect of this invention, there are guides for the racks located on the opposite ends of the racks from the pistons and cylinders, and the guides may be configured to perform additional work. In another aspect, the additional work may be the circulation of lubricants. In another aspect, the additional work may be the supply of compressed air. In a further aspect of this invention, there is a third cylindrical cassette with a third cylindrical inner sleeve and a third cylindrical outer sleeve, the third inner sleeve fitting inside the third outer sleeve and configured so that when the third outer sleeve is rotated in a first direction, the third inner sleeve is also rotated, and when the third outer sleeve is rotated in a second direction opposite to the first direction, the third inner sleeve is not rotated; said third cassette having a eighth bevel gear and a ninth bevel gear at each axial end; and said third outer sleeve having teeth oriented along the axis of the third cassette; a fourth cylindrical cassette in axial alignment with the third cylindrical cassette; the fourth cylindrical cassette having a fourth cylindrical inner sleeve and a fourth cylindrical outer sleeve, the fourth inner sleeve fitting inside the fourth outer sleeve and configured so that when the fourth outer sleeve is rotated in the first direction, the fourth inner sleeve is also rotated, and when the fourth outer sleeve is rotated in the second direction opposite to the first direction, the fourth inner sleeve is not rotated; said fourth cassette having a tenth bevel gear and a eleventh bevel gear at each axial end; and said fourth outer sleeve having teeth oriented along the axis of the cassette; where the racks have teeth on an upper and a lower surface, the teeth on the lower surface of the racks meshing with the teeth on the first and second cassettes and the teeth on the upper surface of the racks meshing with the teeth on the third and fourth cassettes.

In accord with the present invention, there is provided a method of converting linear motion from a set of sources to rotational motion by transmitting the linear motion from a set of sources to a set of racks; the racks alternately rotating a pair of axially aligned cylindrical cassettes in opposite directions of rotation; the cassettes alternately transmitting the rotational motion through one half of the rotation to an output load shaft. In one aspect of this invention, the set of sources are a set of reciprocating piston and cylinders.

In accord with the present invention, there is provided a method of converting linear motion from a set of sources to rotational motion comprising transmitting the linear motion from a set of sources to a set of racks; the racks alternately rotating a pair of axially aligned cylindrical outer sleeves in opposite directions of rotation; the outer sleeves transmitting the rotational motion alternately through one half of the rotation to a pair of inner sleeves; and the pair of inner sleeves alternately transmitting the rotational motion to an output load shaft. In an aspect of this invention, the set of sources are a set of reciprocating piston and cylinders. In another aspect, the outer sleeves transmit the rotational motion alternately through one half of the rotation to a pair of inner sleeves through the use of a comb and retracting pins.

DETAILED DESCRIPTION

This invention involves a device that converts linear into rotational motion using a rack and pinion system as opposed to a piston connected to a crankshaft. An engine incorporating the device uses a normal cylinder and valve mechanism to drive pistons in a reciprocating motion, but unlike in a typical engine, the piston drives a rack and pinion system. The motion is transferred to an output load shaft through a cassette.

Figure 1:
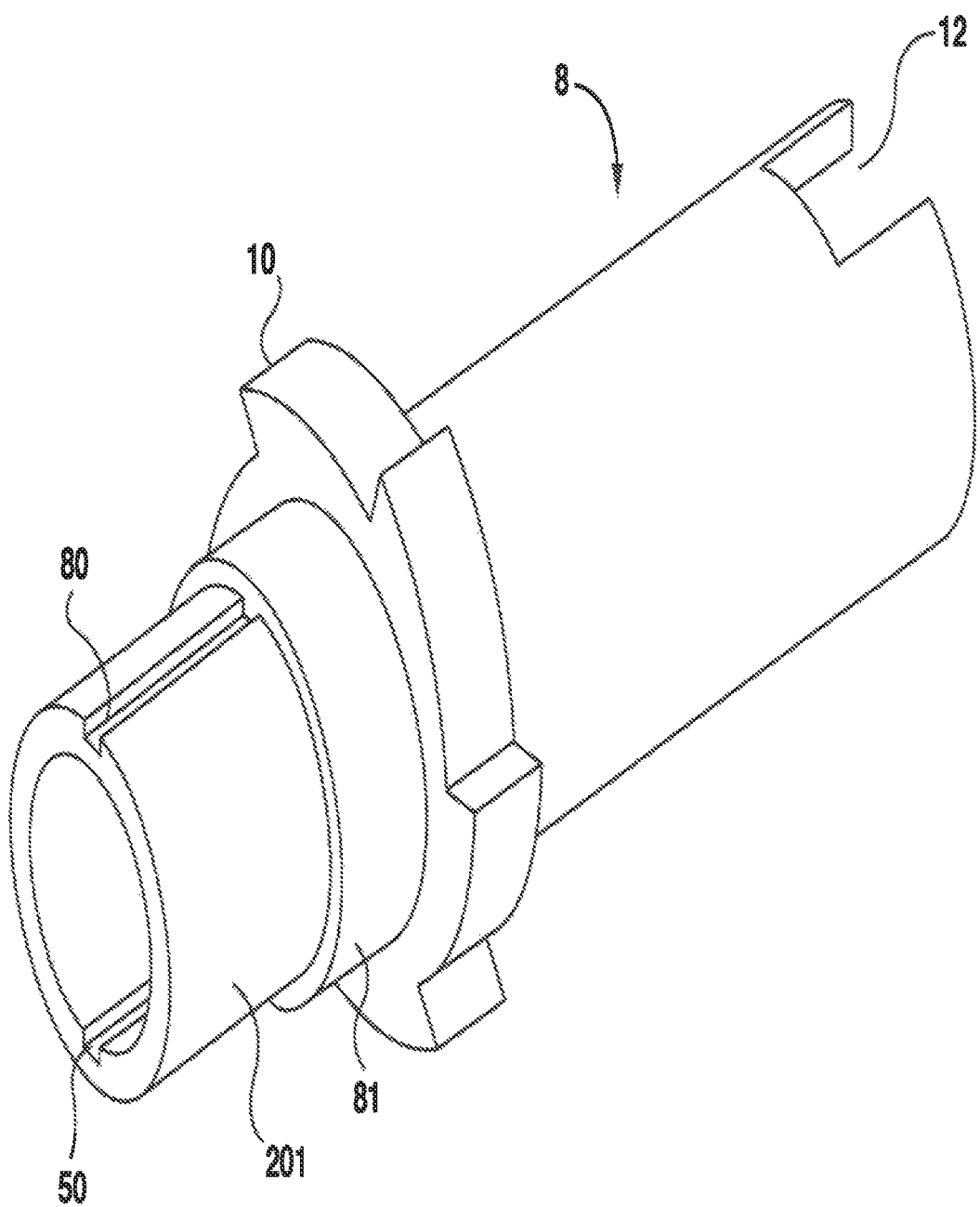
FIG. 1 is a perspective view of an inner sleeve of a cassette.
Figure 2:
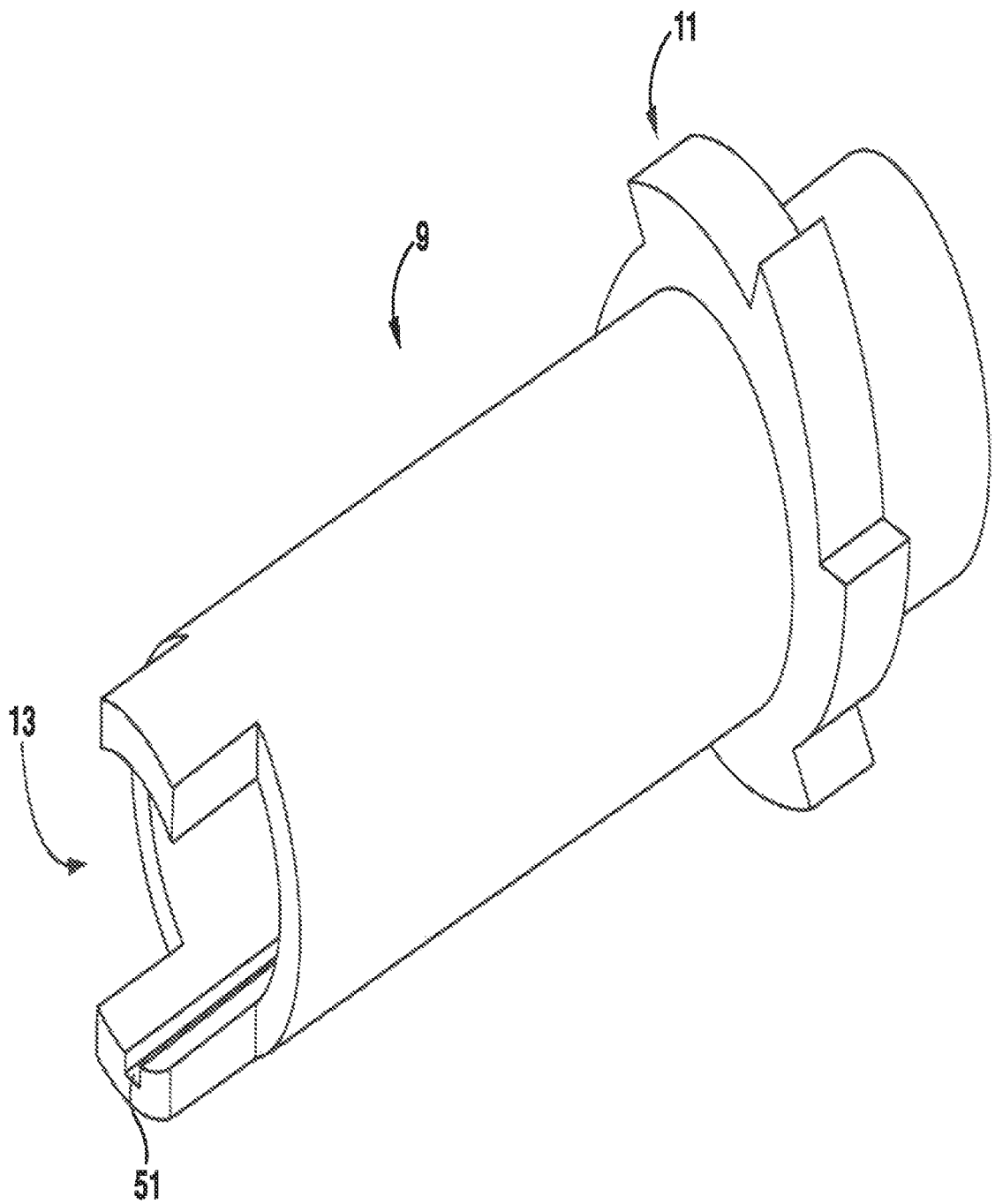
FIG. 2 is a perspective view of a complementary inner sleeve of a cassette.

FIG. 1 shows a steel sleeve 8 with a toothed comb 10 on its circumference with one hand and the connecting grooves 12 on the opposite side of the sleeve. Groove 50 is a keyway that runs the length of steel sleeve 8. Groove 80 is a keyway that runs the length of neck 201. FIG. 2 shows a complementary second steel sleeve 9 with a toothed comb 11 on its circumference with one hand and the connecting grooves 13 on the opposite side of the sleeve. Sleeve 9 has a groove 51 that form a keyway that runs the length of sleeve 9.

Figure 3:
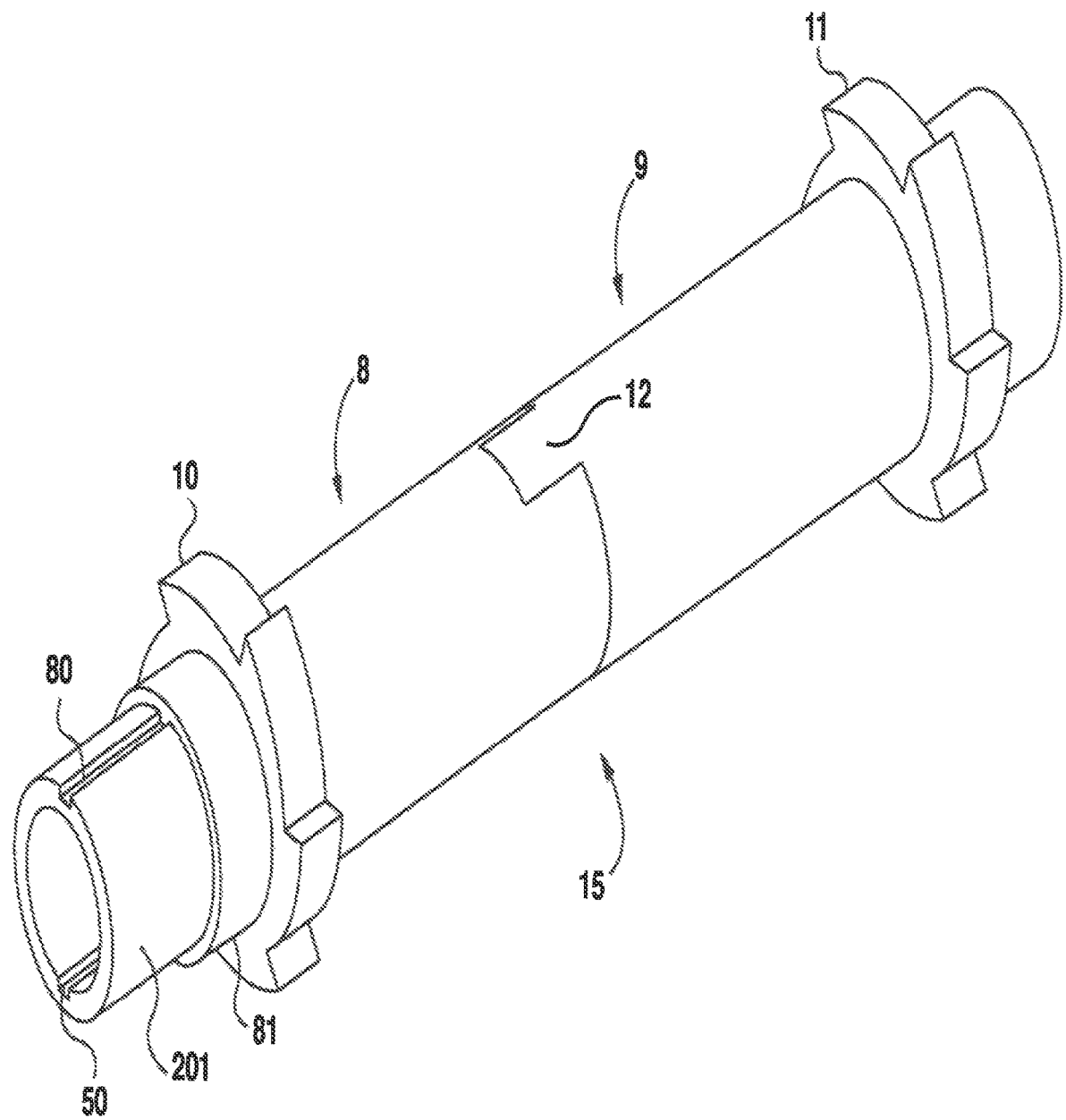
FIG. 3 is a perspective view of joined complementary inner sleeves.

Turning to FIG. 3, Connecting grooves 12 and 13 are complementary and interlock so that sleeves 8 and 9 can create inner steel sleeve 15. When sleeves 8 and 9 are interconnected to form one sleeve, grooves 50 and 51 match to form a keyway running the length of sleeves 8 and 9.

Figure 4:
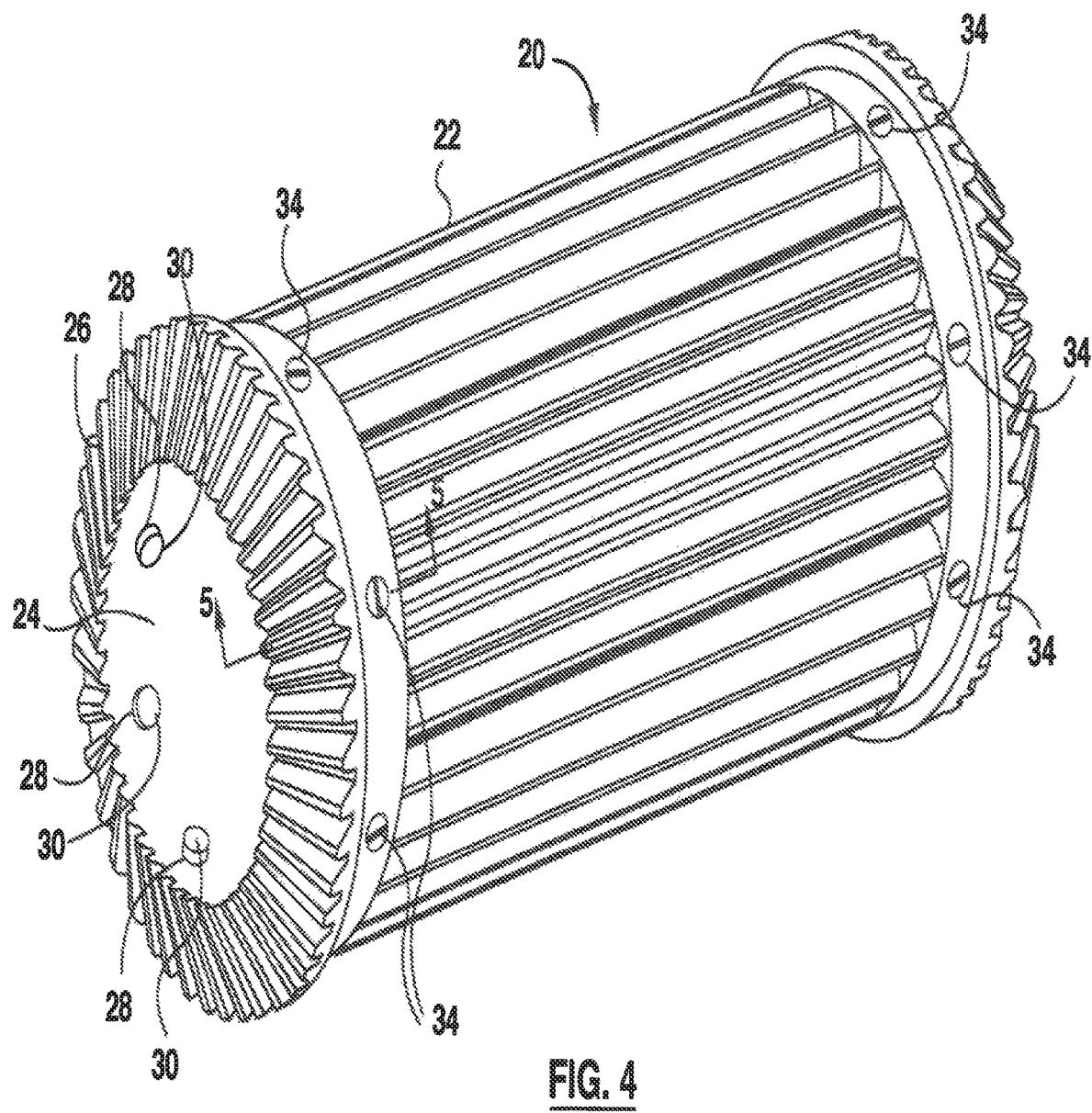
FIG. 4 is a perspective view of an outer sleeve of a cassette.
Figure 5:
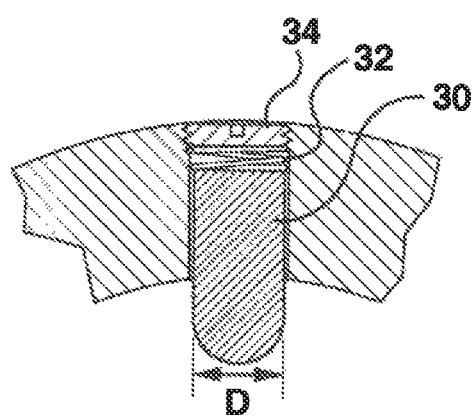
FIG. 5 is a side view of the pin mechanisms in the outer sleeve of a cassette.

FIG. 4 shows an outer steel sleeve 20, in the outer surface of which grooves 22 are cut to form teeth, and on both ends of the outer sleeve axial through-holes 24 are made with teeth cut in the form of a bevel gear 26. The outer steel sleeve has holes 28 in the edges. Turning to FIG. 5, the holes 28 accept slidably inserted steel pins 30, which are constantly pressed inwards by a steel spring 32 which covers a threaded cap 34.

Figure 6:
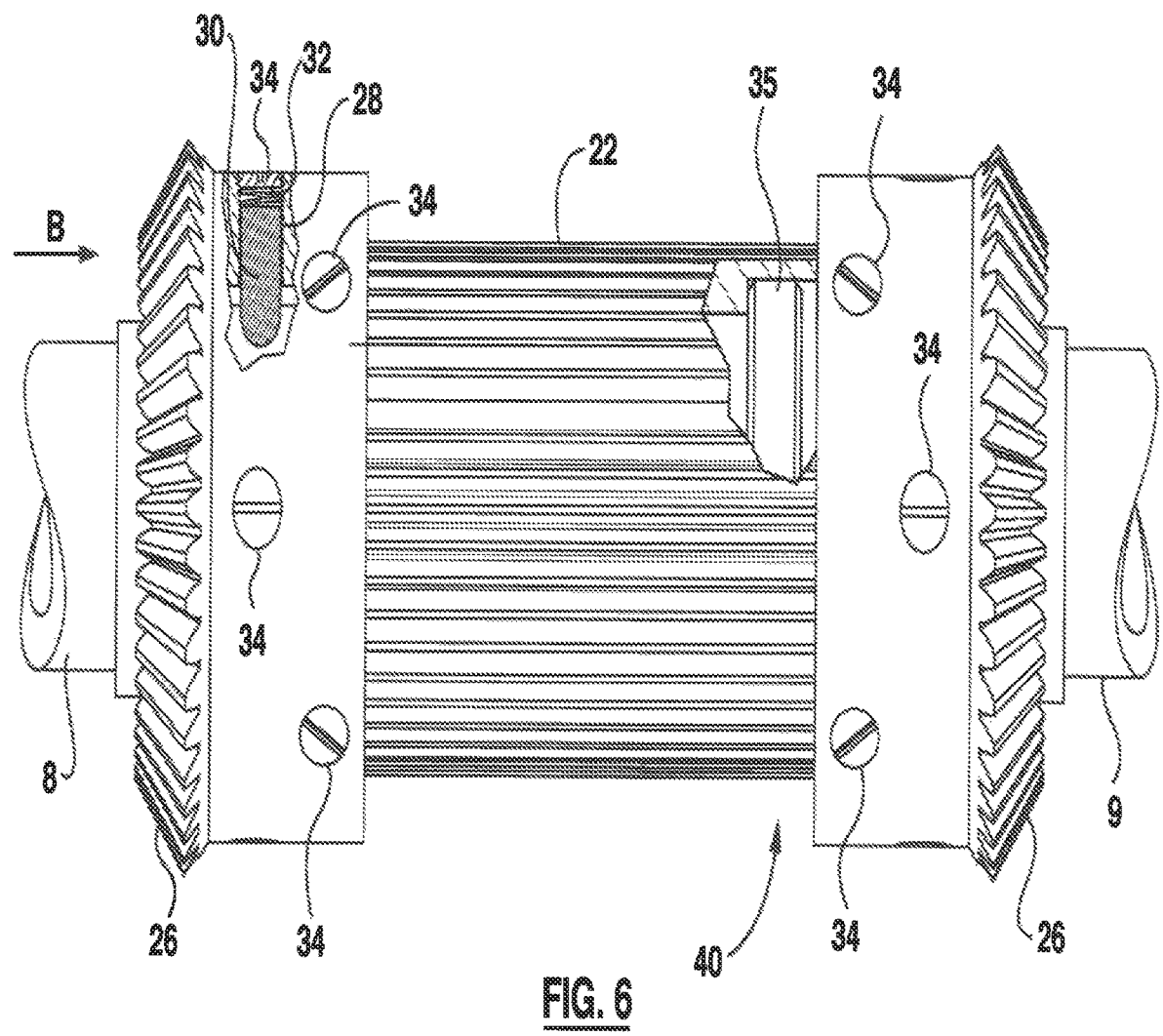
FIG. 6 is a side view of an assembled cassette, with a cutaway to show the pin mechanism.

FIG. 6 shows an assembled cassette 40. The cassette 40 is assembled by press-fitting the inner sleeves 8 and 9 into ball bearings 35, which are pressed into the outer sleeve 20 in the cassettes on both sides, with sleeves 8 and 9 interconnecting as seen in FIG. 3 to create an inner sleeve 15. As a result, when the outer sleeve 20 rotates in one direction of rotation, the slidably inserted steel pins 30 will interact with toothed combs 10 and 11 to rotate sleeves 8 and 9 in the same direction. When outer sleeve 20 rotates in the opposite direction of rotation, steel pins 30 will slide up toothed combs 10 and 11 and sleeves 8 and 9 will not rotate.

Figure 11:
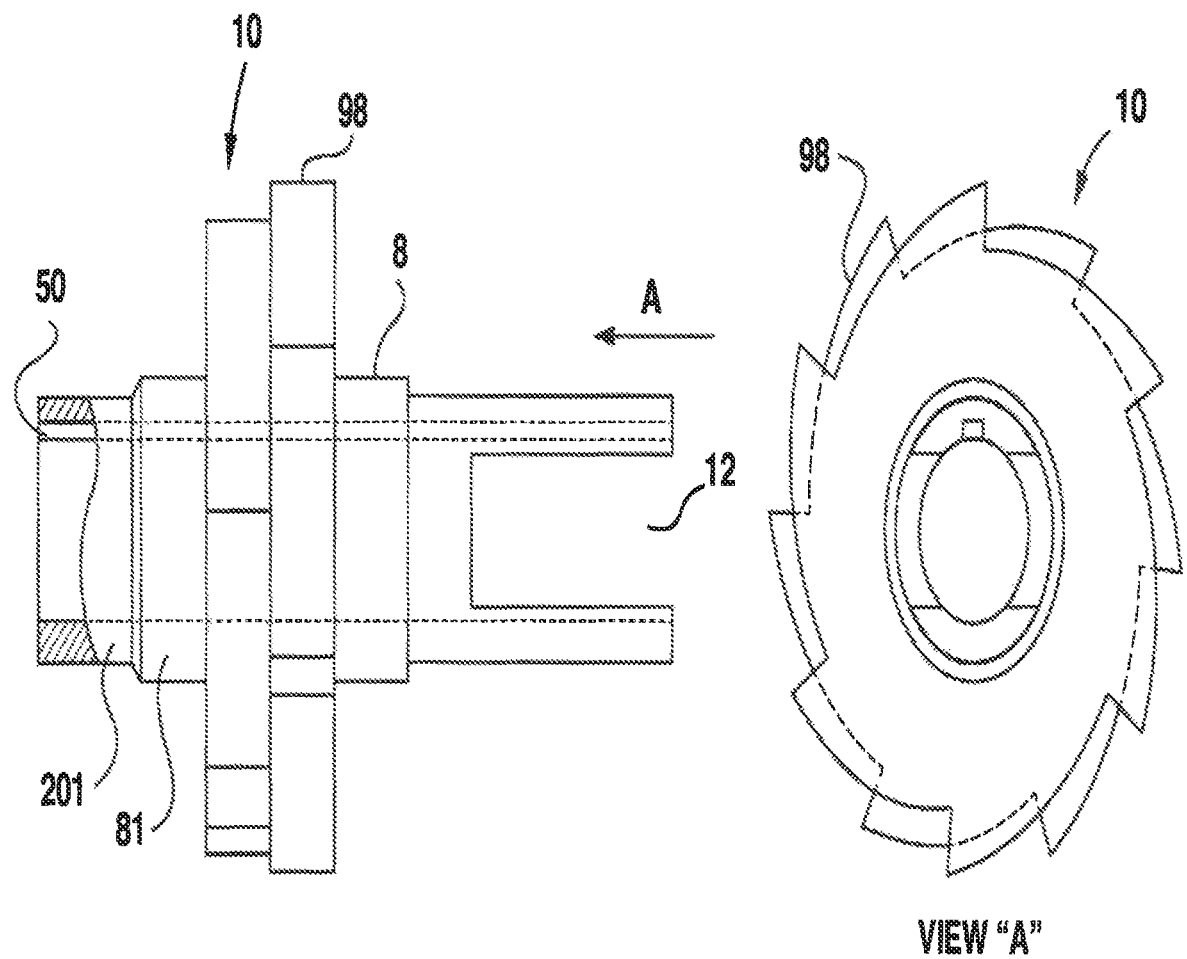
FIG. 11 is a perspective view of an inner sleeve of a cassette with two toothed combs.

In the embodiment illustrated in FIG. 4, there is one row of holes 28 with steel pins 30; in a second embodiment, there are two rows of holes and pins, as may be seen in FIG. 6. These embodiments are mirrored by either one or two parallel rows of combs 10 and 11 on the inner sleeves, as illustrated in FIGS. 1 and 11, respectively.

Figure 7:
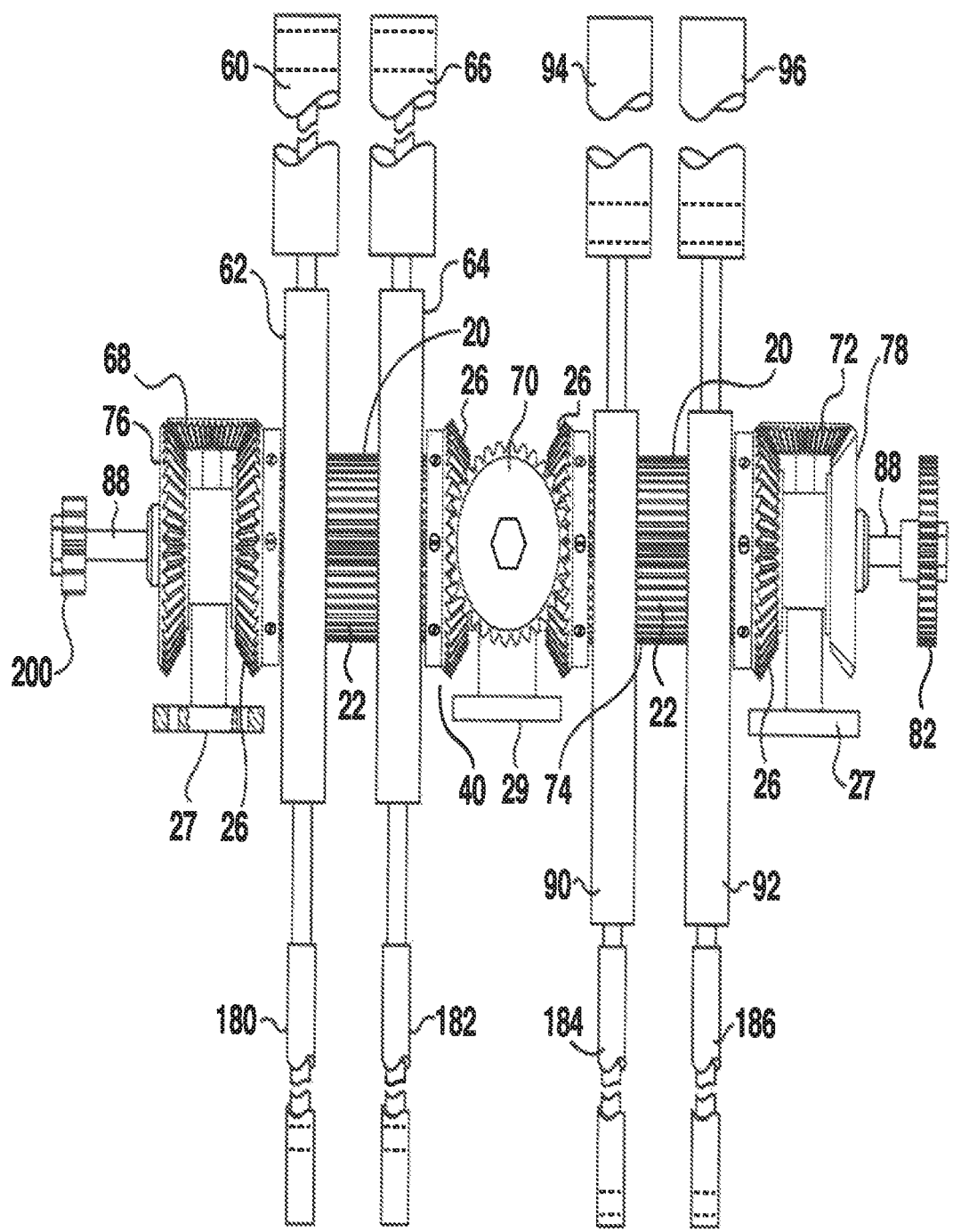
FIG. 7 is a plan view of the inventive device which converts the linear motion of the piston into the rotary motion of the output shaft.
Figure 8:
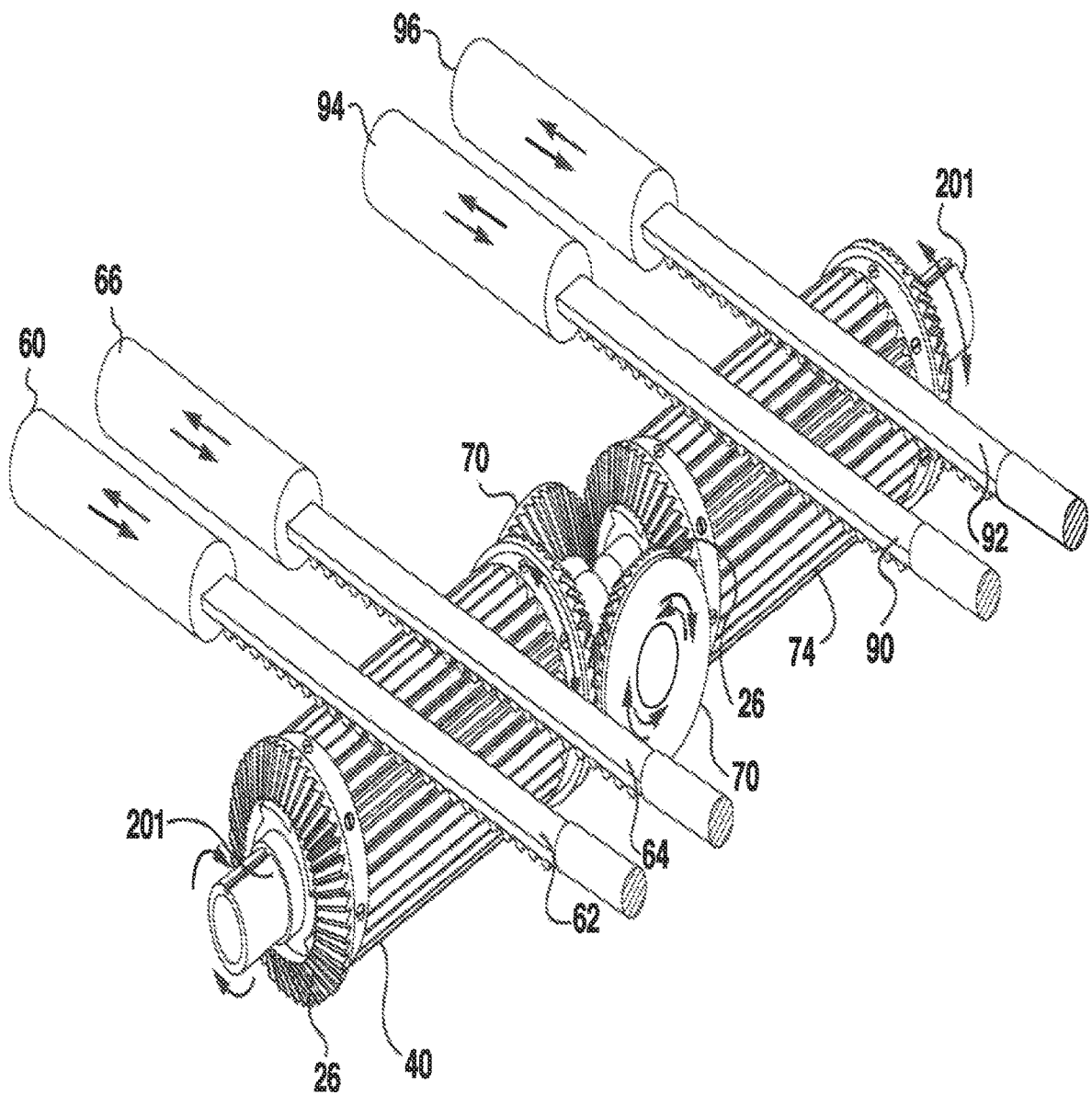
FIG. 8 is a perspective view of a the device of FIG. 7, illustrating the direction of movement.

FIG. 7 shows the inventive mechanical device as a whole, while FIG. 8 shows the mechanical device in perspective, showing motion. There is provided a second cassette 74, which is similar to cassette 40 except that the toothed combs of the inner sleeves of cassette 74 are the mirror images of those on sleeves 8 and 9 of cassette 40. There are also provided intermediate bevel gears 68, 70 and 72. The teeth of bevel gears 68, 70 and 72 are connected to the teeth of the bevel gears 26 of cassettes 40 and 74.

Figure 16:
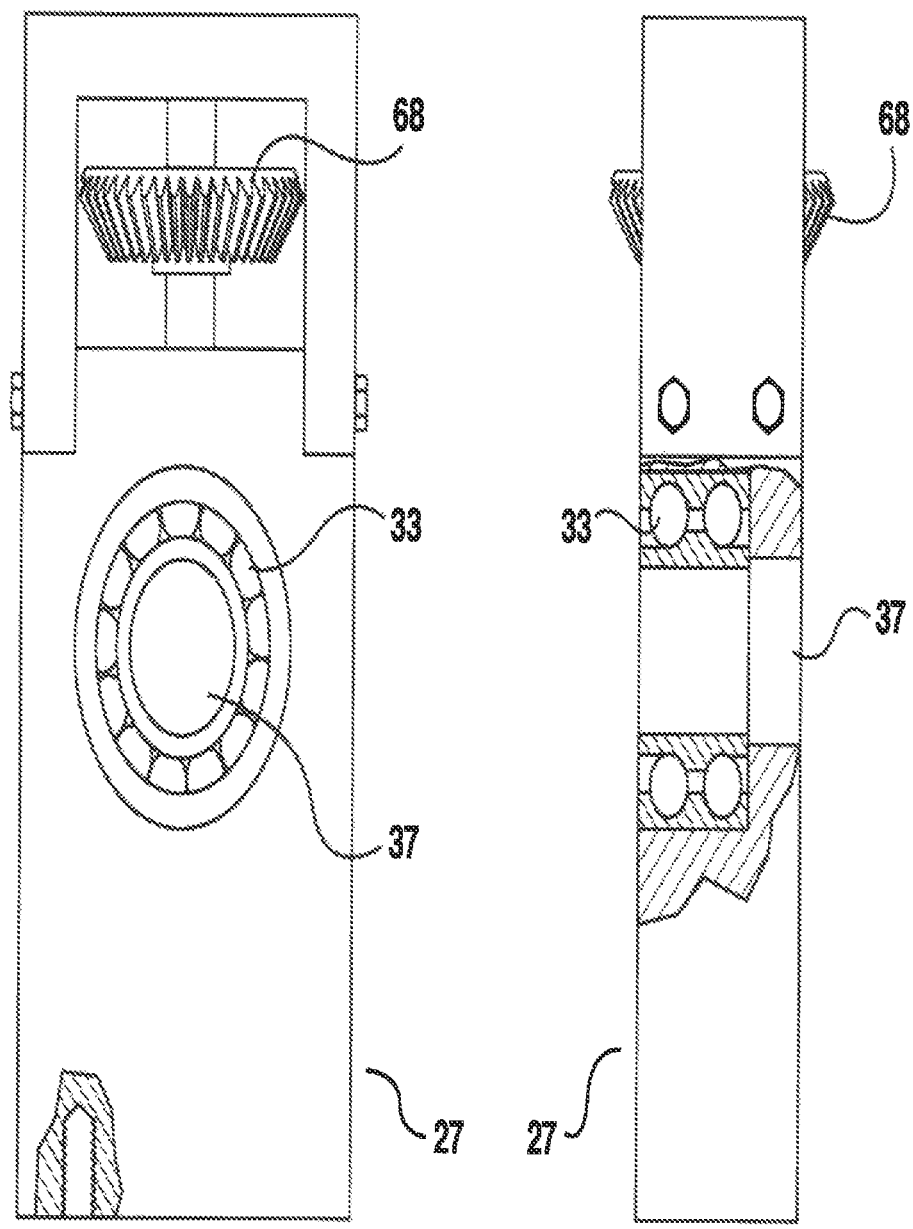
FIG. 16 is a side and cut-away view of a holder for the extended neck of the inner sleeve of the cassette.

The circumferential surface 81 of sleeve 8 is fitted into the ball bearings sitting in is held in holder 27. Extended neck holder 31 serves a similar function for cassette 74. Extended neck holder 27 is illustrated in FIG. 16. Turning to FIG. 16, holder 27 includes ball bearings 33; the circumferential surface 81 of sleeve 8 passes through opening 37. Returning to FIG. 7, neck 201 is fixed to tapered segment bevel gear 76 (and a similar arrangement applies to bevel gear 78).

Figure 9:
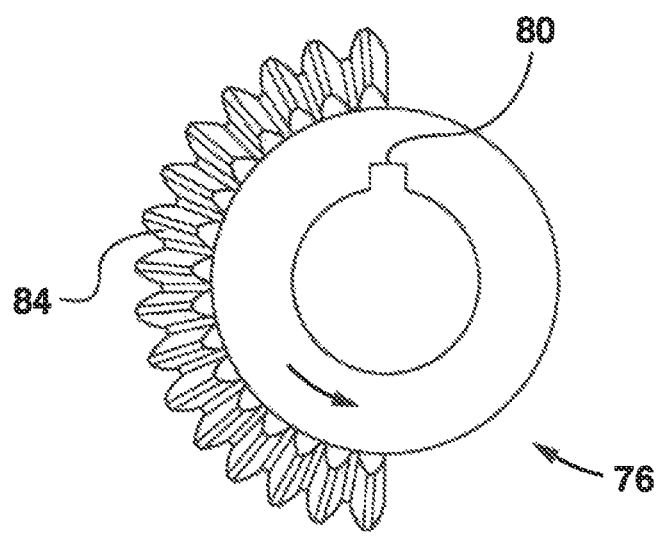
FIG. 9 is a side view of a tapered segment bevel gear.
Figure 10:
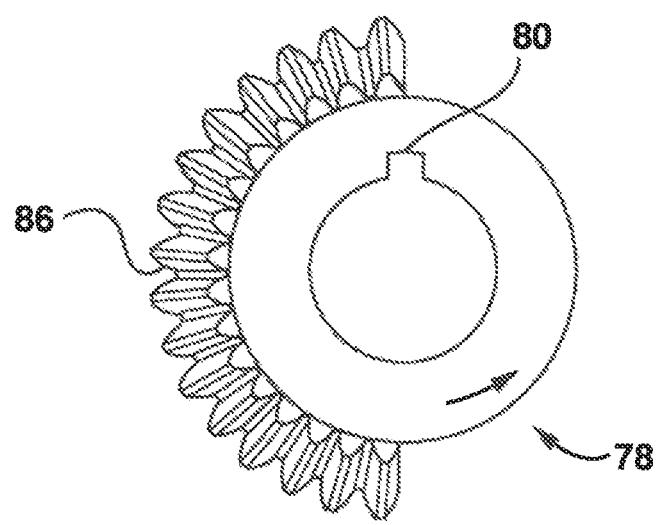
FIG. 10 is a side view of a second tapered bevel gear.

Turning to FIGS. 9 and 10, tapered segment bevel gears 76 and 78 have teeth 84 and 86 only on half their circumference. Tapered segment bevel gears 76 and 78 also have grooves 80.

Figure 15:
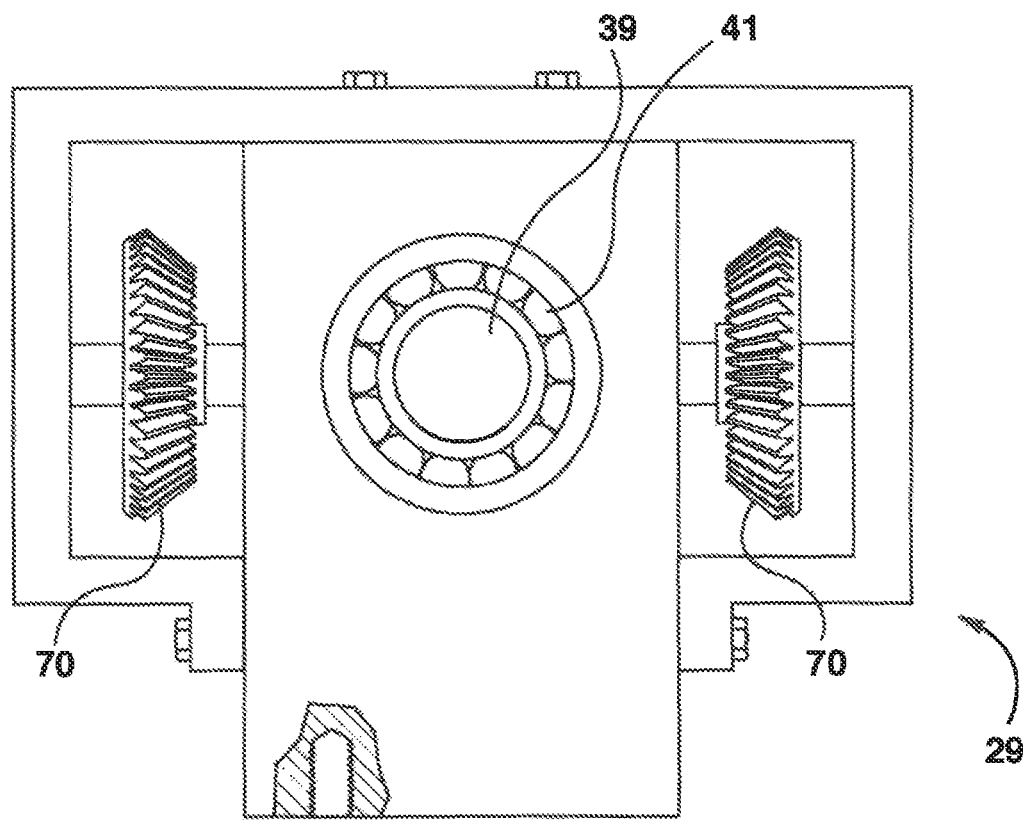
FIG. 15 is a side view of a central holder.

An output load shaft 88 with splines thereon is inserted and engages grooves 50 and 51 in sleeve 8 and 9 and grooves 80 on bevel gears 76 and 78 fixed on the sleeves 8 and 9. There is also provided a central holder 29, which is illustrated in FIG. 15. Turning to FIG. 15, the output load shaft 88 passes through opening 39, which has ball bearings 41. Central holder 29 also holds intermediate bevel gears 70 in place.

Returning to FIG. 7, guides 180, 182, 184 and 186 hold racks 62, 64, 90 and 92 in place and guide the racks in their movement. Cylinders 60, 66, 94 and 96 and racks 62, 64, 90 and 92 are arranged in a cylinders block. Pinion 200 mounted on the output load shaft 88 through a timing belt drive rotates the camshaft of the engine.

As may be seen in FIG. 8, the racks 62 and 64 move back and forth in a reciprocating or alternating (linear) motion. Cassette 40 rotates backwards and forwards (or alternates between rotating backward and forwards, in a first direction and an opposite second direction), and, sleeves 8 and 9 of cassette 40 are rotated in one direction of rotation. Returning to FIG. 7, there is provided a second cassette 74, which is similar to cassette 40 except that the toothed combs of the inner sleeves of cassette 74 are the mirror images of those on sleeves 8 and 9 of cassette 40. There are also provided intermediate bevel gears 68, 70 and 72. The teeth of bevel gears 68, 70 and 72 are connected to the teeth of the bevel gears 26 of cassettes 40 and 74.

The motor starts when an electric starter rotates flywheel 82. Flywheel 82 is attached to output load shaft 88. Engaging with the splines on the output load shaft 88, inner sleeves in cassettes 40 and 74 begin to rotate, as well as tapered segment bevel gears 76 and 78. (Recall that tapered segment bevel gears 76 and 78 only engage with intermediate gears 68 and 72 through half their rotation successively)

When the output load shaft 88 rotates, tapered segment gear 78 rotates gear 72, which through its end teeth rotates cassette 74. The rotation of cassette 74 moves racks 90 and 92 which in turn move the pistons in cylinders 94 and 96. Meanwhile, gear 70 moves cassette 40 in the opposite direction of rotation, moving racks 62 and 64 and the pistons in cylinders 60 and 66 in the opposite direction of motion to racks 90 and 92; and the pistons in cylinders 94 and 96. Also, tapered segment bevel gears 76 engages gear 68. The connection of the working parts of gears 76 and 78 occurs alternately. This starts the feed of gas/air mixtures into cylinders 60, 66, 94 and 96.

After ignition of the fuel mixture in one of the cylinders, rotation of the output load shaft 88 of the engine is caused by engaging the sliding steel pins 30 located in the outer sleeves 20 with the teeth of comb 10 on the inner sleeve 8 of the cassette. The linear movement of the piston in the cylinder is transmitted to the rack that rotates the outer sleeve of the cassette. The outer sleeve rotation is transmitted to the inner sleeve of the cassette and thus to the output shaft. Rotation of the output load shaft 88 is alternately carried by each of the cassettes 40 and 74 each cassette controls for half the rotation of the output shaft.

Turning to FIG. 7, suppose the combustible mixture ignited in cylinder 60. The piston in cylinder 60 moves from the upper to the lower position, and its rack 62 moves the outer sleeve 20 of cassette 40 through interaction with grooves 22. At the same moment rack 64 moves (it is also engaged by the grooves 22 of outer sleeve 20 of cassette 40) and the piston in cylinder 66 moves from the upper position to the lower producing absorption of the combustible mixture into cylinder 66.

Rotating outer sleeve 20 of cassette 40 through the teeth of bevel gear 26 and the teeth of gear 70 transmits the opposite rotation of the outer sleeve cassette 74. The piston of the cylinder 94 moving up to compress the combustion mixture in the cylinder 94.

The combustible mixture then ignites in cylinder 94. The piston in cylinder 94 moves from the upper to the lower position, and its rack 90 moves the outer sleeve 20 of cassette 74 through interaction with grooves 22. At the same moment rack 92 moves (it is also engaged by the grooves 22 of outer sleeve 20 of cassette 74) and the piston in cylinder 96 moves from the upper position to the lower producing absorption of the combustible mixture into cylinder 96.

The rotation of cassette 74 is transmitted via intermediate bevel gear 70 to racks 62 and 64, moving the pistons in cylinders 60 and 66 from the lower to the upper position. This compresses the combustible mixture in cylinder 66 and expels the exhaust from cylinder 60. The combustible mixture in cylinder 66 is now ready for ignition in the next cycle of the engine.

In operation, the inner sleeves 8 and 9 of cassettes 40 and 74 are alternately rotated by the operation of racks 62, 64, 90, and 92, creating virtually continuous rotation of output load shaft 88 by alternately engaging slidable pins 30 outer sleeves of the cassettes 40 and 74 with the teeth combs on the internal sleeves 8 and 9.

Figure 17A:
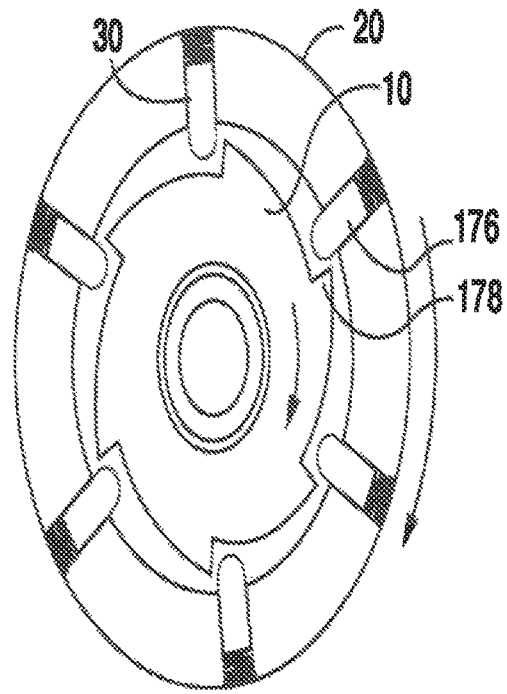
FIGS. 17 A-D illustrate the interaction of the pins and comb to rotate the inner sleeve in one direction of rotation.
Figure 17B:
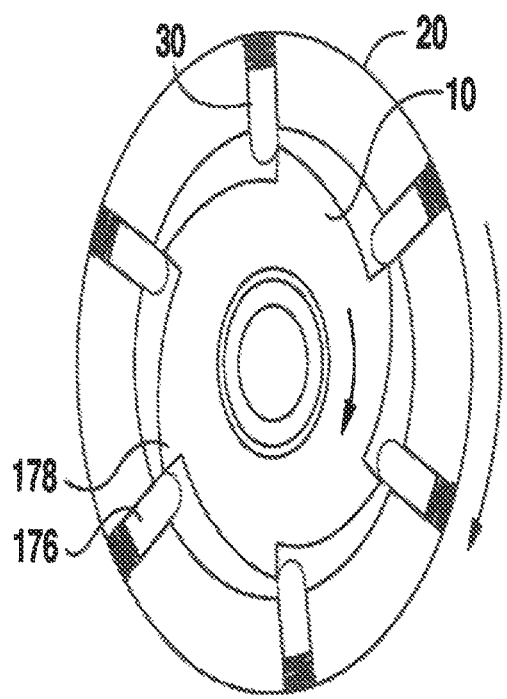
Figure 17C:
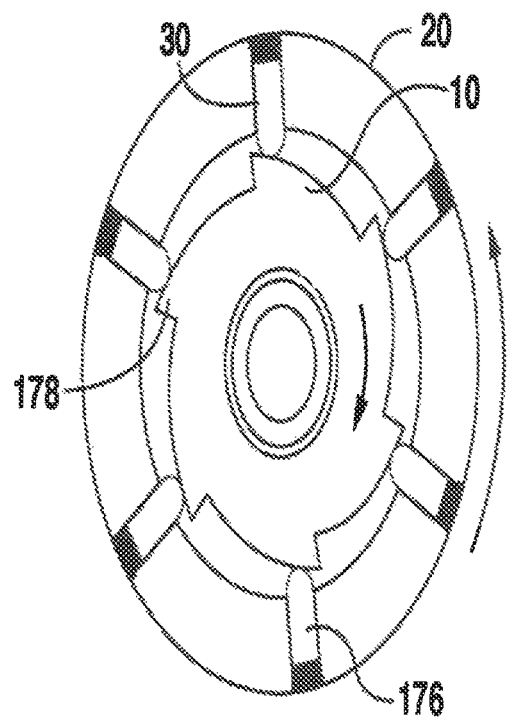
Figure 17D:
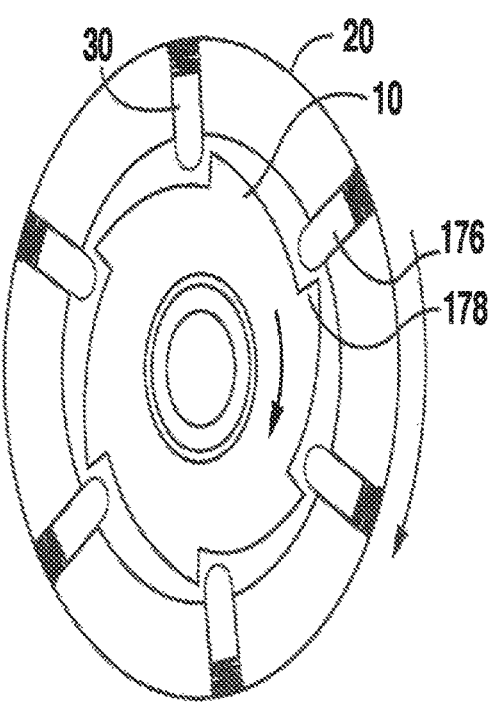

This is further illustrated in FIGS. 17a-17d. Turning to FIG. 17a, the pins 30 abut the teeth of comb 10 at the beginning of a rotation, and the rotation of outer sleeve 20 pushes pins 30 against comb 10 thus rotating inner sleeve 8 (which in turn rotates output load shaft 88). Specific pin 176 abuts tooth 178. When the rotation of outer sleeve 20 stops 180 degrees later, the pins 30 will abut comb 10 as illustrated in FIG. 17b, and pin 176 abuts tooth 178 but has rotated 180 degrees from the position in FIG. 17a. When the outer sleeve 20 reverses rotation, the pins will retract as they are pulled over comb 10, as seen in FIG. 17c. Inner sleeve 8 will continue to rotate, pushed by the output load shaft 88. As may be seen in FIG. 17c, pin 176 and tooth 178 are separating as inner sleeve 10 and outer sleeve 20 rotate in different directions. When the outer sleeve finishes its reversed rotation through 180 degrees, the pins 30 will again be in a position to push against the teeth of comb 10 and impart rotational motion as seen in FIG. 17d, and pin 176 and tooth 178 will be in the position illustrated in FIG. 17d, which is essentially identical to FIG. 17a.

This engine design increases engine power compared to the consumption of energy. It eliminates the inherent inefficiency of a crankshaft design. Compared to prior art rack and pinion engines, the present invention utilizes a balanced, cylindrical mechanism with rotating elements. The present invention has relatively few moving parts, allowing for advantages in maintenance and in the life of the engine before parts need to be replaced, particularly when operating at high speeds. The inventive engine uses one cassette for every two pistons instead of multiple gears and complex mechanisms. In addition, this design produces a compact motor, and generally reduces the weight of the engine.

In a further embodiment, turning to FIG. 11, it is possible to have an additional toothed comb 98 on inner sleeve 8 parallel to toothed comb 10, and correspondingly have an extra set of steel pins in the outer sleeve 20. An additional toothed comb can also be added to inner sleeve 9, resulting in two additional toothed combs when inner sleeves 8 and 9 are combined in one cassette. In all cases, corresponding extra steel pins are added to outer sleeve 20. This will increase the transfer of torque to the output shaft.

In another embodiment, guides 180, 182, 184 and 186 can be replaced with a mechanism to use the work associated with the motion of racks 62, 64, 90 and 92. For example, guides 180, 182, 184 and 186 may be replaced with cylinders and positions which may be used to supply compressed air or circulate lubricants.

Figure 12:
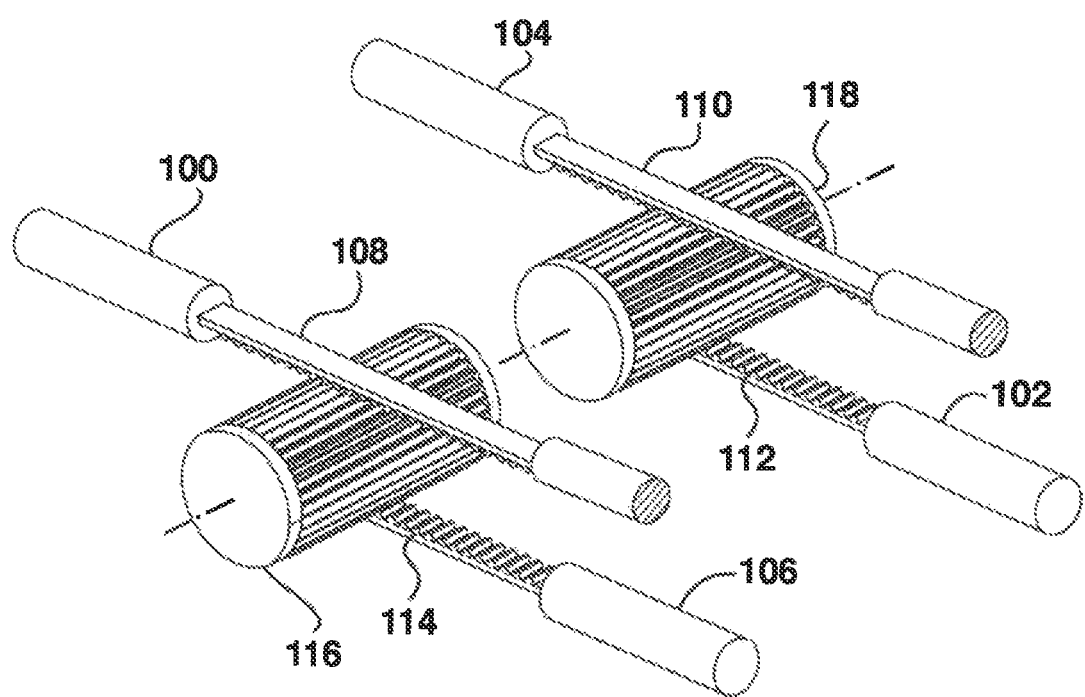
FIG. 12 is a perspective view of an alternative arrangement of cylinders, racks and cassettes.

In another embodiment, turning to FIG. 12, an alternative arrangement of the cylinders (labelled 100, 106, 102, and 104), racks (labelled 108, 110, 112 and 114) and cassettes (labelled 116 and 118) is shown. In this arrangement, the pistons in cylinders 100 and 106 move to the high and low positions in unison, and the pistons in cylinder 104 and 102 also move at the same time. With this structure, the size of the motor is reduced in length compared to the classical design row.

Figure 13:
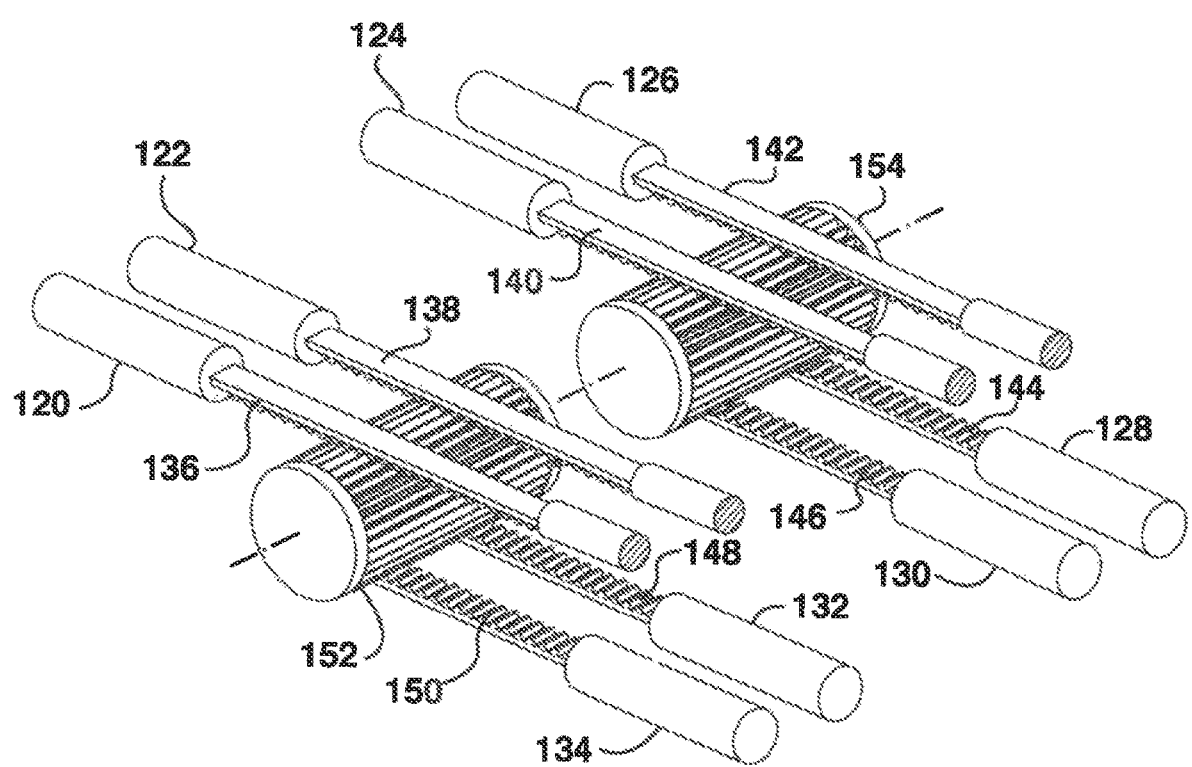
FIG. 13 is a perspective view of an alternative arrangement of cylinders, racks and cassettes, doubling the number of cylinders and racks.

In another embodiment, turning to FIG. 13, the number of cylinders (labelled as 120, 122, 124, 126, 128, 130, 132 and 134) and racks (labelled 136, 138, 140, 142, 144, 146, 148 and 150) is doubled to eight while holding the number of cassettes (labelled 152 and 154) constant. The cylinders are paired with cylinders on the opposite side of the cylinder: i.e. 120 with either 134 or 132; 122 with either 132 or 134; 124 with 130 or 128, and 126 with 130 or 128. This increases the engine power. In a further embodiment, cylinders 128, 130, 132 and 134 may be switched off when they are not needed and the engine will operate with only cylinders 120, 122, 124 and 126. This switching may be done automated.

One may constructively increase the number of cylinders in this manner, and so increase the power of the engine. The use of longer cassettes allows the addition of more cylinders.

Figure 14:
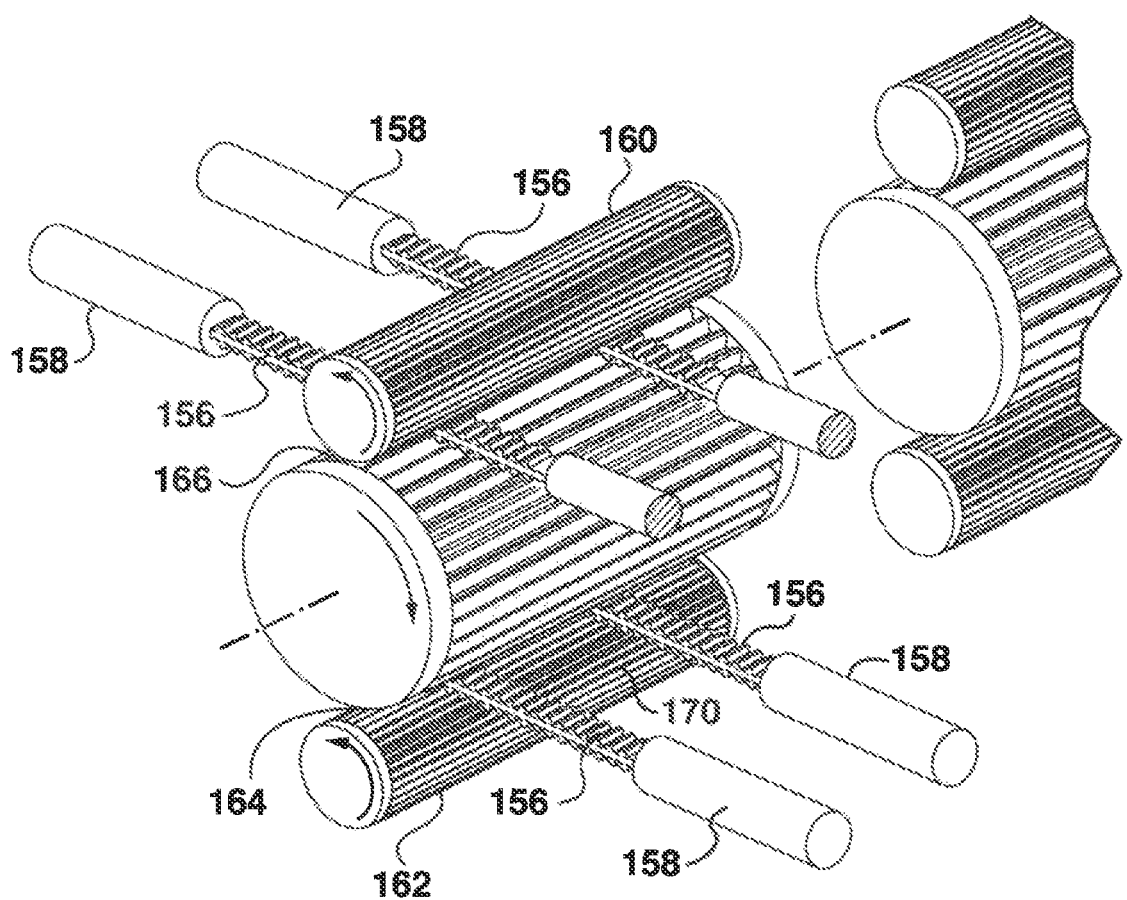
FIG. 14 is a perspective view of an alternative arrangement of cylinders, racks and cassettes, where the racks have double sided teeth and additional cylinders are added.

In another embodiment, illustrated in FIG. 14, racks 156 have teeth on both sides and are driven by pistons inside cylinders 158. Cylinders 160 and 162 have longitudinal grooves 168 and 170 which mesh with the teeth of racks 156. At their ends, cylinders 160 and 162 have teeth 164 and 166 which engage with bevel gear 26 at the ends of the cassettes. This embodiment is designed to handle heavy loads.

Although the forgoing description and accompanying drawings relate to specific preferred embodiments of the present invention as presently contemplated by the inventor, it will be understood that various changes, modifications and adaptations may be made without departing from the spirit of the invention.

The invention claimed is:

1. A method of converting linear motion from a set of sources to rotational motion comprising the steps of:
   transmitting the linear motion from a set of sources to a set of racks;
   the racks alternately rotating a pair of axially aligned cylindrical cassettes in opposite directions of rotation;
   the cassettes alternately rotating an output load shaft through one half of a full rotation;
where the set of sources are a set of reciprocating piston and cylinders; and
   where each cylindrical cassette has a cylindrical inner sleeve and a cylindrical outer sleeve, the inner sleeve fitting inside the outer sleeve and configured so that when the outer sleeve is rotated in a first direction, the inner sleeve is also rotated, and when the outer sleeve is rotated in a second direction opposite to the first direction, the inner sleeve is not rotated; said cassette having a bevel gear at each axial end; and said outer sleeve having teeth oriented along the axis of the cassette.

2. The method of claim 1, where the inner sleeve has two combs and the outer sleeve has two sets of retractable fingers configured to interact with said combs.

3. The method of claim 2, where each inner sleeve when rotated rotates the output load shaft.

4. The method of claim 1, where the inner sleeve has four combs and the outer sleeve has four sets of retractable fingers configured to interact with said combs.

5. The method of claim 4, where each inner sleeve when rotated rotates the output load shaft.

6. The method of claim 1, where each inner sleeve when rotated rotates the output load shaft.

* * * * *